United States Patent [19]
Collins

[11] 3,907,510
[45] Sept. 23, 1975

[54] SYSTEM FOR BURNING SULFUR AND ABSORBING SULFUR DIOXIDE IN WATER

[75] Inventor: Dwight D. Collins, Bakersfield, Calif.

[73] Assignee: Chemsoil Corporation, Bakersfield, Calif.

[22] Filed: Dec. 26, 1972

[21] Appl. No.: 318,511

[52] U.S. Cl. .................... 23/278; 23/262; 23/283; 423/543; 55/233; 261/94
[51] Int. Cl. ............................................ C01b 17/54
[58] Field of Search ............ 23/278, 263, 283, 262, 23/261; 261/94–99; 55/233; 423/543

[56] References Cited
UNITED STATES PATENTS

| 349,414 | 9/1886 | Sundstrom | 202/191 |
|---|---|---|---|
| 917,561 | 4/1909 | Davble | 261/37 |
| 1,185,029 | 5/1916 | Waggaman | 23/261 X |
| 1,364,716 | 1/1921 | Clayton | 23/278 |
| 2,025,402 | 12/1935 | Saint Jacques | 23/277 |
| 2,090,386 | 8/1937 | Ferguson | 423/542 |
| 2,188,133 | 1/1940 | Hepburn | 431/353 X |
| 2,807,522 | 9/1957 | Russell | 23/278 |
| 3,064,954 | 11/1962 | Eckert | 261/98 |
| 3,170,969 | 2/1965 | Lerner et al. | 261/94 |
| 3,226,201 | 12/1965 | Harmon | 23/262 |
| 3,227,201 | 1/1966 | Pokorny | 431/353 X |
| 3,314,766 | 4/1967 | Mukherji | 23/278 |
| 3,627,134 | 12/1971 | Mattson | 210/192 |

Primary Examiner—James H. Tayman, Jr.
Attorney, Agent, or Firm—Donald D. Mon

[57] ABSTRACT

A system for burning sulfur to sulfur dioxide and absorbing the sulfur dioxide in water. Sulfur is burned in a sulfurburning tower that is divided into an upper and a lower chamber, each of which is supplied with a separate air supply. The gases of combustion are conducted to a quenching chamber having a tube made of lead and cooled by a cooling jacket, and also having means to inject water into a quenching passage in the tube. The effluent from the quenching chamber is conducted to an absorption tower where it rises through a packing, countercurrent to a stream of water.

7 Claims, 15 Drawing Figures

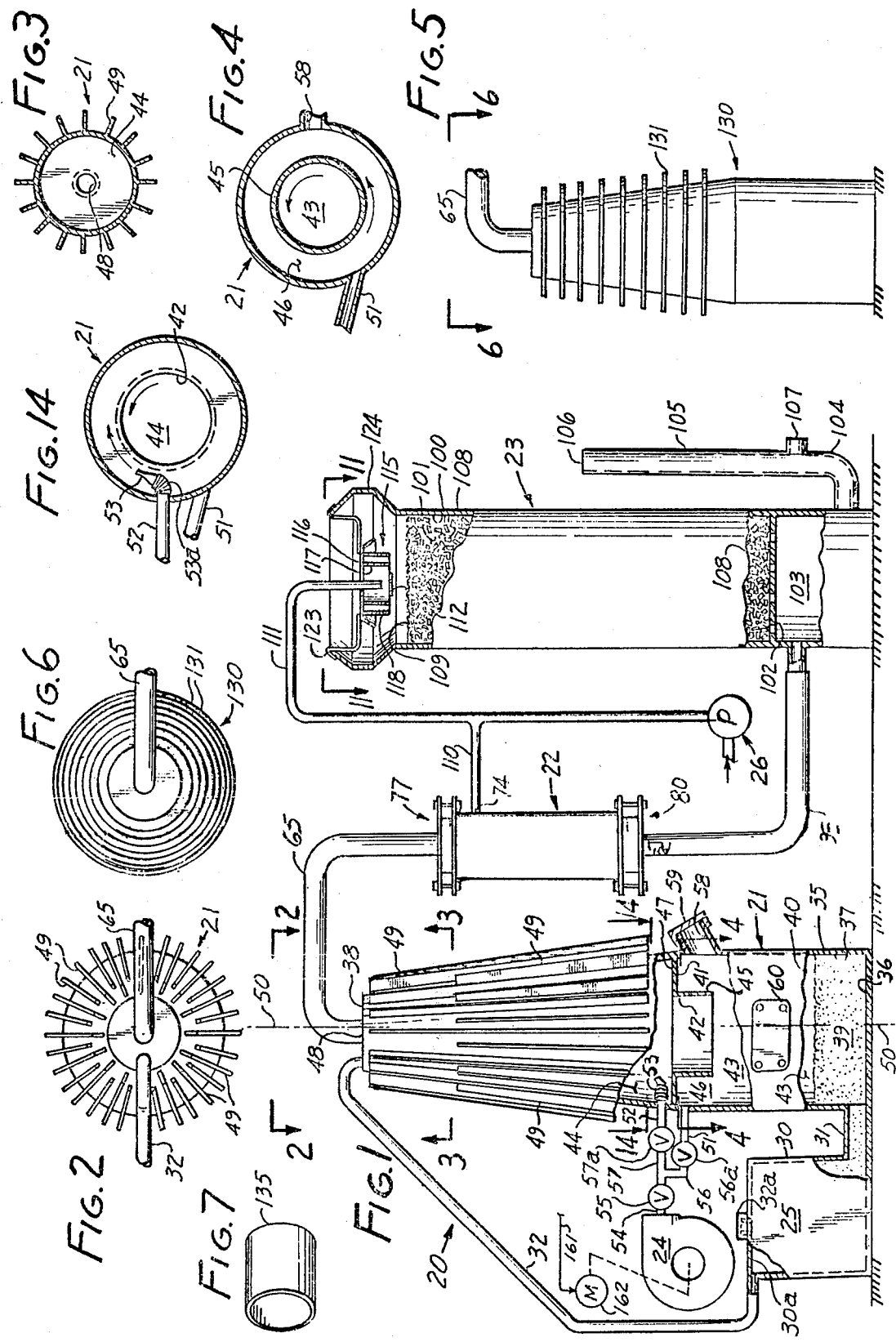

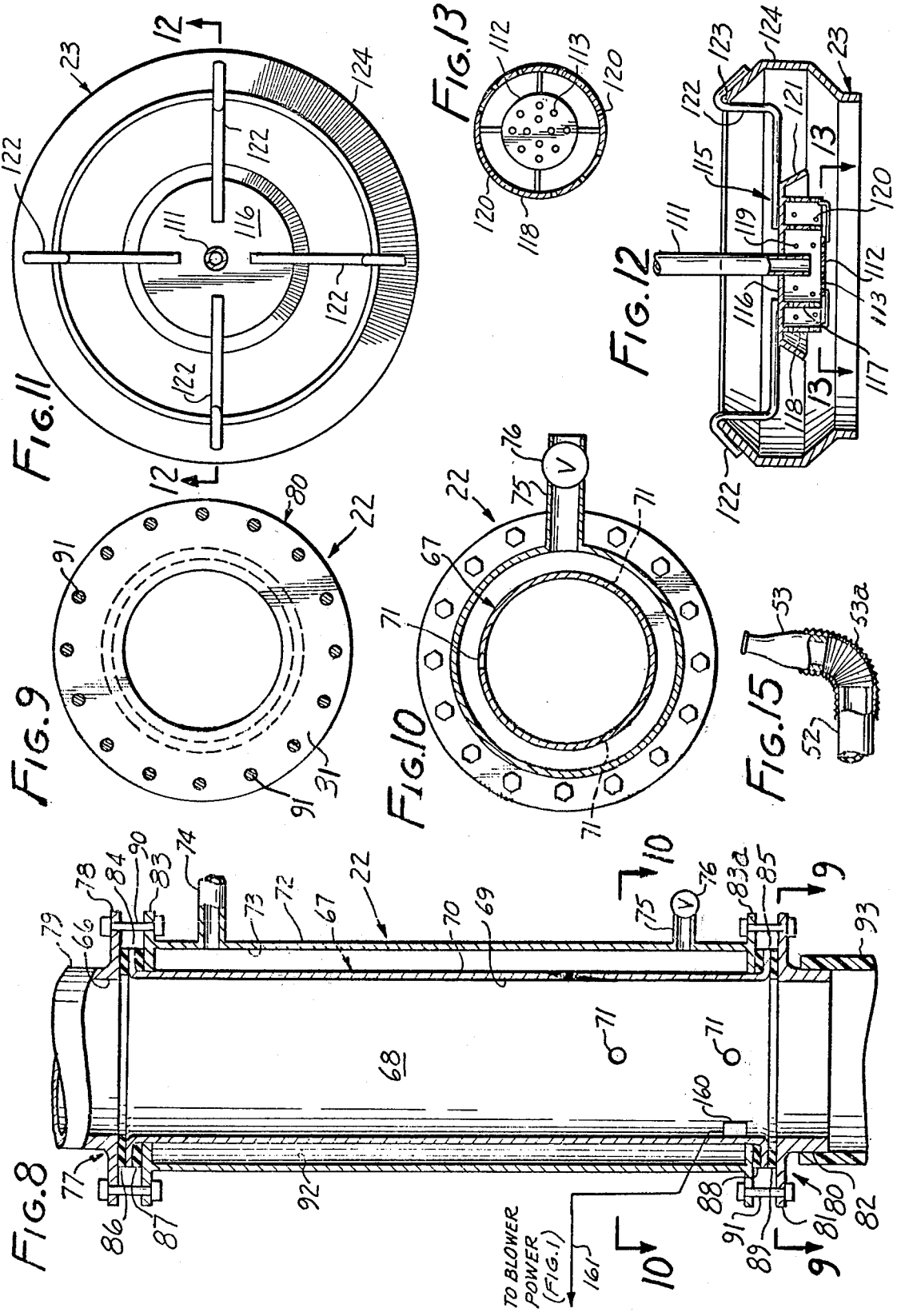

SYSTEM FOR BURNING SULFUR AND ABSORBING SULFUR DIOXIDE IN WATER

This invention relates to a system for oxidizing sulfur to sulfur dioxide and then absorbing the sulfur dioxide in water.

For many usages of sulfur dioxide, it is cheaper and more convenient to generate the gas at the site near where it is to be utilized by burning sulfur in oxygen and then absorbing the sulfur dioxide in water than it is to purchase the gas in tanks and meter it into a stream of water. This is especially the case in agricultural applications where bottled sulfur dioxide gas is too expensive, and where it is simple to provide a burner adjacent to an irrigation canal, and absorb the sulfur dioxide in the canal water which is to be applied to the cropland.

There are many already-known devices for burning sulfur and for absorbing the sulfur dioxide in water, one of which is shown in U.S. Pat. No. 3,627,134, issued to Mattson on Dec. 14, 1971, and another of which is shown in the presently co-pending patent application of applicant and one Darrell R. Harmon, Ser. No. 113,289, filed Feb. 8, 1971, entitled "Sulfur-Burning and Gaseous Products Absorption System and Components Therefor," which application shares a common assignee with this instant application.

It is a characteristic of the prior art systems that the sulfur is burned in air in some kind of chamber, and the sulfur dioxide thereby produced is passed into a tower where it is absorbed by water. With increasingly stringent regulations being issued regarding discharge of sulfur compounds into the atmosphere, it has become more difficult to provide a field-type unit which can operate without close attention at relatively high output rates and with substantially total absorption of the sulfur dioxide. It is of course possible, and it has been possible for years, to attain a high absorption under plant conditions with good instrumentation and close process control continuously maintained by trained personnel. However, in the treatment of canal water and application of the material to cropland, it is not possible to provide such personnel and controls at a reasonable cost. It is an object of this invention to provide a device which efficiently burns sulfur to sulfur dioxide, and secures its substantially total absorption into water (the term "absorption" referring both to the chemical reaction of sulfur dioxide with water and with its dissolved constituents and to a true solution of sulfur dioxide in water), with simple controls and adjustments which do not require continuous supervision.

The processes which take place in these systems involve some stringent operating conditions. Temperatures produced by the burning of the sulfur can be expected to be in excess of 2000°F. It is relatively straightforward to convey hot dry sulfur dioxide gas, even mixed with atmospheric nitrogen, in conventional materials, but there is substantial water in the humidity of the air which is burned in this process, and the gases produced are hot and moist. This quality of gas is quite damaging to many conventional materials of construction. Accordingly, it is an object of this invention to utilize as little air as possible in the combustion process so as to minimize the water (humidity) introduced into the sulfur-burning tower. However, when this is done, it is necessary to provide means to maintain the products of combustion at an acceptably low temperature, because the cooling effect of extra air is not present.

In the course of this process, very hot moist gases must be cooled and absorbed into water. In some processes, coolers have been provided, but their construction is too expensive for common field units because of the corrosiveness of the gases. Attempts directly to quench the hot gases in water have been failures because at some transition point the quenching procedure produces a very hot mixture of water and gases, and this has quickly destroyed even very expensive and sophisticated materials. It is an object of this invention to provide a direct-quenching chamber in which the hot relatively dry gases can be quenched by a stream of water to a substantially lower temperature at which the material can be handled by conventional, inexpensive materials of construction. The quenching chamber is made of lead, and its rate of attrition has proved to be very low.

Furthermore, prior art absorption towers suitable for field use involve a number of problems associated with the environment in which they are used. They are most frequently operated in open fields and draw their water from open canals or wells. It is not unusual for objects to be dropped into the top of the towers, and for spray heads to be clogged by sand and detritus. Accordingly, it is an object of this invention to provide an absorption tower which provides optimum means for the counter-current flow of gases and water wherein the water can be introduced through a non-clogging distributor in a tower construction which is wide-open to atmosphere and which cannot readily be occluded to the extent that the system could be plugged.

A system according to this invention includes a sulfur-burning tower comprising an enclosure formed of a bottom, a peripheral sidewall, and a top. An outlet port exits from the enclosure. A divider is disposed at an intermediate level in the enclosure and serves to divide it into a lower chamber and an upper chamber. The upper chamber is shaped as the frustum of a cone. Sulfur is contained in, and is primarily burned in, the lower chamber. The divider extends inwardly from the sidewall and has a passage therethrough. The divider forms a peripheral shelf in the upper chamber, surrounding the passage. A cylindrical, downwardly-depending skirt extends around the passage and depends from the divider into the lower chamber, forming an annular region between itself and the peripheral sidewall. A primary air inlet discharges into the annular region, and a secondary air inlet discharges into the upper chamber adjacent to the shelf.

A quenching chamber has an inlet and an outlet, its inlet being connected to the outlet of the sulfur-burning tower. The quenching chamber comprises a tube made of lead and has an inner wall, an outer wall, and a quenching passage bounded by the inner wall. A cooling jacket surrounds the lead tube in fluid contact with its outer wall. Means is provided to inject water into the quenching passage.

An absorption tower comprises a vertically-rising chamber having a gas inlet at a lower elevation, a gas outlet at an upper elevation, and a product outlet at a lower elevation. A packing in said chamber provides an environment for exposure of water to gases rising in the chamber. Non-clogging water injection means discharges water onto the packing. The water passes through the packing countercurrent to the rising gases which are received from the quenching chamber.

According to a preferred but optional feature of the invention, a water from the cooling jacket is injected into the quenching passage through a perforation in the wall of the lead tube for the purpose of quenching the hot gases.

According to still another preferred but optional feature of the invention, the water injection means for the absorption tower comprises a deflector which disperses a stream of water above the packing.

The above and other features of this invention will be fully understood from the following detailed description and the accompanying drawings in which:

FIG. 1 is a side elevation, partly in cutaway and partly in schematic notation, showing the presently preferred embodiment of the invention;

FIG. 2 is a top view of a portion of FIG. 1 taken at line 2—2 thereof;

FIGS. 3 and 4 are cross-sections taken at lines 3—3 and 4—4, respectively, in FIG. 1;

FIG. 5 is a side elevation of an alternate embodiment for a portion of FIG. 1;

FIG. 6 is a top view taken at line 6—6 of FIG. 5;

FIG. 7 is a perspective view of a portion of FIG. 1;

FIG. 8 is an axial cross-section of a portion of FIG. 1;

FIGS. 9 and 10 are cross-sections taken at line 9—9 and 10—10, respectively, of FIG. 8;

FIG. 11 is a top view taken at line 11—11 of FIG. 1;

FIG. 12 is an enlarged fragmentary axial cross-section of a portion of FIG. 1;

FIG. 13 is a cross-section taken at line 13—13 of FIG. 12;

FIG. 14 is a cross-section taken at line 14—14 of FIG. 1; and

FIG. 15 is a fragmentary view of a portion of FIG. 1.

A system 20 for burning sulfur and for absorbing the products of combustion into water is shown in FIG. 1. Basically, it comprises a sulfur-burning tower 21, a quenching chamber 22, an absorption tower 23, an air blower 24 and a sulfur hopper 25. Air is supplied to the system from atmosphere by blower 24, and water is supplied to the system from a source, such as a canal, a well, or a municipal water supply, by pump 26.

The details of the above basic elements of the system will now be described. The sulfur hopper 25 consists of a bin 30 having a removable, airtight top 30a, and an outlet pipe 31 which connects to a lower region of the sulfur-burning tower. A balance pipe 32 fluidly interconnects the top of the sulfur-burning tower to the top of the sulfur hopper to prevent air lock in the sulfur hopper. Alternatively, a suction breaking vent cap 32a may be installed in the top of the hopper. This will prevent a vacuum from building up in the top of the hopper. As best shown in said co-pending patent application, Ser. No. 113,289, pipe 31 feeds sulfur into the bottom of the sulfur-burning tower. Under burning conditions, the sulfur will be molten in the tower, and the molten condition will extend through the pipe and into the bottom of the hopper so that sulfur flows from the hopper into the sulfur-burning tower to maintain a constant level. Because pipe 31 is filled with liquified sulfur, a vacuum above the sulfur in the hopper could impede flow of the sulfur into the sulfur-burning tower. The balance pipe or suction breaking vent will prevent such a circumstance from occurring.

The sulfur-burning tower includes an enclosure 35, having a bottom 36, a peripheral sidewall 37 and a top 38. The enclosure is closed and fluid-tight except for the openings yet to be described. Sulfur 39 inside the sulfur-burning tower has an exposed surface 40 at which combustion occurs.

A divider 41 comprises a metal plate which is fixed to the peripheral sidewall of the enclosure and bounds a passage 42 at its center. The divider divides the enclosure into a lower chamber 43 and an upper chamber 44. A skirt 45 is fixed to the lower surface of the divider. It surrounds the passage and projects downwardly into the lower chamber, forming a continuation of the passage. It is cylindrical and forms an annular region 46 between itself and the peripheral sidewall in the lower chamber.

The upper chamber is a tapered frustum of a cone rising above the divider. The divider forms a shelf 47 radially outward of the passage 42, and the bottom portion of the upper chamber is stepped outwardly from the passage at this elevation by the shelf. An outlet 48 is formed at the upper end of the upper chamber. Cooling fins 49 are fixed to the outside of the peripheral wall to radiate heat therefrom and to cool the gases inside the upper chamber. It has been found advantageous in field use to direct these fins vertically so that their planes intersect the vertical axis 50 of the cooling tower. Some of the fins are shorter than the others so as to pack the maximum number of fins into the available area.

A primary air inlet 51 enters the lower chamber 43 through the peripheral sidewall, and a secondary air inlet 52 enters the upper chamber through the peripheral sidewall. The primary air inlet discharges into annular region 46, preferably at a skew angle relative to axis 50 so as to set up an initial swirling movement of the incoming air. As best shown in FIGS. 4 and 14, the inward flow is about tangential and in a horizontal plane. The direction of resulting swirl is counterclockwise looking downward and this direction of swirl exists in the passage. Accordingly, the gases entering the upper chamber swirl in this direction.

A nozzle 53 is fitted to a secondary air inlet. Its direction of discharge is preferably adjustable. FIGS. 14 and 15 show a stiffly flexible corrugated hose joint 53a supporting the nozzle so that the nozzle is universally mounted i.e., it can be adjusted to point in any desired direction within a broad range. It has been found advantageous to direct the nozzle so that the secondary air has at least some component of direction in opposition to the swirling motion described above. This makes the movement of the air more turbulent, provides a more efficient cooling action, and appears to give such few burning particles of sulfur as may have entered the upper chamber a better opportunity to complete their combustion before they leave the sulfur-burning tower. It is disadvantageous to have sulfur particles downstream of the sulfur-burning tower. Accordingly the nozzle is directed to have a clockwise component of direction. It usually will also have an upward component of direction as well, perhaps about 10°.

Air blower 24 is preferably of the turbine type. The pertinent characteristic of this blower is that it produces a sensibly constant pressure while delivering a demanded volume, of course within the range of horsepower available from its motor. The volume demanded (or delivered) can be adjusted by a downstream valve, and the upstream pressure will remain sensibly constant, as will the rate of rotation of the impeller. Usually it will be driven by a synchronous motor. In practice, the upstream pressure at the valve might vary by as much as 25 to 30%, but this is regarded as a sensibly constant pressure when compared to the change in pressure which occurs when valve settings are changed downstream from most other types of pressure sources. When a sensibly constant upstream pressure is maintained, closer and more reliable flow settings can be made, and an individual machine can be used to generate sulfur dioxide over a broad range of burning rates. One useful blower of this type is sold by North American Manufacturing Company of Cleveland, Ohio, as its type 2308. It has a ¾ hp motor delivering approximately 170 cubic feet per minute of air at 100% of the motor's rating. It is a single stage blower. Using this blower, approximately 100 pounds of sulfur can be burned per hour using about 150 cubic feet of air per minute.

The output from the blower is discharged through an air pipe 54 which is controlled by a master valve 55. This may be a blast gate type or a butterfly type, either of which can adjustably determine the size of an orifice. The air pipe below the master valve divides into primary and secondary pipes 56, 57 which are respectively connected to the primary and secondary air inlets. Trim valves 56a and 57a can be installed in pipes 56 and 57, respectively, if closer control is desired for varying conditions. These are also butterfly or gate valves.

A neck 58 is fitted with a cap 59. An ignition device can be dropped into the lower chamber through the open neck to light the sulfur and the cap then installed. The combustion will thereafter be self-sustaining so long as sufficient air is supplied. Any desired means may be provided for cleaning out the lower chamber, but a typical example is a removable plate 60 in the peripheral sidewall.

Quenching chamber 22 is shown in full detail in FIGS. 8–10. It receives the products of combustion from the outlet of the sulfur-burning tower through conduit 65. The gases conveyed by conduit 65 are very hot (about 600°F, although temperatures between about 300° to 1000°F. can be found here under various conditions). These gases principally comprise sulfur dioxide, atmospheric nitrogen and water in some form from the humidity of the air. Conduit 65 is connected to inlet 66 of the quenching chamber. The quenching chamber has a tube 67 made of lead with a central quenching passage 68. It has an inner wall 69 defining the passage, and an outer wall 70.

Means to inject water into the quenching passage comprise ports 71 through the walls thereof. The outer wall of the lead tube is surrounded by a cooling jacket 72. This jacket comprises a cylindrical tube 73 having a water inlet 74, and for some purposes, an optional water outlet 75. This outlet has a valve 76 so that outlet 75 can be closed.

An inlet nipple 77 has a flange 78 and a neck 79. An outlet nipple 80 has a flange 81 and a neck 82. Flange members 83 and 83a are formed on tube 73.

Flares 84 and 85 are formed on the ends of the lead tube. These flares are outwardly-turned and are sandwiched between pairs of sealing rings 86, 87 and 88, 89. These sealing rings are preferably made of a deformable plastic material resistant to the material being conveyed. In turn, these sealing rings are sandwiched between the flanges 78 and 81 and flange members 83 and 83a, and these are respectively held together by sets of bolts 90, 91, which draw them together to make a fluid-tight seal.

Flange members 83 and 83a are continuously joined to the wall of cylindrical tube 73 to form a jacket enclosure 92 in contiguity with the outer wall of the lead tube. In a preferred embodiment of the invention, outlet 75 may be eliminated, or valve 76 left closed, and flow of water will be from the water inlet 74, through the jacket enclosure, and then into the quenching passage through ports 71. Ports 71 serve as water injection means to inject water in the quenching passage. Should greater cooling capacity be sought, then a total water input can be provided greater than that to be injected, and the excess can flow through outlet 75. There are preferably four of ports 71, and generally they will be located toward the lower end of the quenching chamber to reduce the risk of damage to the system upstream from water backing upstream of the quenching passage, should the system suddenly shut down. Most of the backed up water containing sulfur dioxide will then still be retained in the lead tube.

When four ports 71 are provided, they will ordinarily be spaced 120° apart and spaced axially along the tube, perhaps an inch apart. In such an arrangement, two of these ports will be axially aligned as shown in FIG. 8. Of course, water injection means separate from and independent of the cooling jacket can be used instead of ports 71, such as a nozzle discharging into the quenching passage from a pipe which opens directly into the quenching passage.

Conduit 65 will be made of a material which can resist the effects of the hot gases from the sulfur-burning tower. Cast iron is a suitable substance for this purpose, although stainless steel may be used, if desired. Downstream from the quenching chamber, the effluent is relatively cool, usually as low as 50°F. This effluent comprises nitrogen gas, sulfur dioxide gas, a dilute solution of sulfurous acid, and dissolved sulfur dioxide in water. There may also be some sulfuric acid. This effluent can be conveyed in a conduit 93 which is made of a plastic such as polyvinyl chloride. This is a very much cheaper than metal conduitry which is resistive to this effluent.

Conduit 93 discharges its contents into the bottom end of absorption tower 23. Absorption tower 23 includes a vertically rising enclosure 100 forming a chamber 101. The enclosure may, if desired, be made of fiberglas because its contents will be cool. If preferred, it may be made of stainless steel. A grating 102 is spaced upwardly from the bottom of the enclosure and leaves a plenum 103, into which the effluent from the quenching chamber discharges. A product conduit 104 taps the bottom portion of the enclosure. It has a suction breaker 105 with an open end 106 and a side-tapped product outlet 107. The product flows from product outlet 107 to a point of use. The elevation of outlet 107 should be below the grating, because it determines the flooded height in the tower.

Grating 102 supports a packing 108 which will more fully be described below. A screen 109 rests atop the packing to exclude foreign matter. Tests have shown that it is best practice to make grating 102 of wire woven mesh, because this appears to reduce or eliminate any tendency for surface tension effects to occur which would impede flow of gases and liquid through the grating. Stainless steel wire, 0.080 inches diameter, woven to No. 2 mesh size, with about 70.6% open space has proved to be optimum for this purpose. It has been found that screens or perforated plates with round holes do not perform as well as woven mesh.

Pump 26 discharges water into water inlet 74 of the cooling jacket through conduit 110, and also discharges water through a branch conduit 111 to an upper level in the absorption tower. The absorption tower has an open upper end whose cross-section area preferably is at least as great as that of the enclosure beneath it so as not to restrict the outflow of gases. Conduit 111 discharges downwardly toward a splash plate 112, which splash plate is suspended in the path of the stream, and has perforations 113 therethrough. Some of the water will pass directly through the perforations in the splash plate, and the remainder will splash upwardly against a distributor 115. The distributor includes a central distributor plate 116 and a pair of cylindrical skirts 117, 118 which depend downwardly therefrom. The axial length of skirt 118 is about equal to that of skirt 117, and the splash plate stands at about the same elevation as the bottom end of these skirts. Both of the skirts include perforations 119, 120, respectively. A splash guard 121 is formed as a frustum of a cone surrounding the cylindrical skirts to limit the excursion of the water which they distribute. This simple distributor arrangement forms a very effective means for distributing water over the upper surface of the packing. It does so without using nozzles which can clog, instead using a wide-open pipe having an inside diameter of perhaps 2 inches whose flow will not be impeded by foreign matter which is likely to be encountered in the field. Support rods 122 are attached to the distributor and are hooked over the upper end 123 of the enclosure. This distributor is readily removed and replaced.

The enclosure includes a peripheral enlargement 124 which provides additional cross-sectional area adjacent to the distributor so that, even though the distributor occludes some of the area of the enclosure, the loss of cross-section is replaced by the peripheral enlargement, and there will be no impediment to the free flow of gases from the tower. This is important because any impediment to the exit of gases from this tower can result in a backing up of the system, and a deleterious effect on the burning rate in the sulfur-burning tower.

FIGS. 5 and 6 show that cooling fins can be disposed other than vertically on the sulfur-burning tower. For example, a sulfur-burning tower 130, which is the same in all other respects as sulfur-burning tower 21, has cooling fins 131 in the form of horizontal discs affixed to its peripheral wall. Either form of fin can be used, as well as many other configurations. The selection will depend on the environment in which the device is to be put to use. Vertical fins appear to be the best choice for open-air use in the field.

A detail of packing element 135 for the absorption tower is shown in FIG. 7. It is a hollow cylinder, or more precisely, a cylindrical tube whose surface is not wetted by water, for example, a polyvinyl chloride cylinder, or a cylindrical tube of some other material coated with polyvinyl chloride. The function and advantage of such a packing are more fully described in the aforesaid Ser. No. 113,289, to which reference may be made for more details. Suffice it to say at this point that a large number of these elements are dumped at random into the enclosure of the absorption tower where they will provide an effective environment for the absorption of the sulfur dioxide in the water in counter-current flow. The cylinders may conveniently have a length of approximately 1 inch, an outer diameter of approximately three-fourths inch, and a wall thickness of approximately 1/16 inch. Non-wettable materials other than polyvinyl chloride may be used instead, and also wettable materials may be coated by a non-wettable material, if desired, for example, a polyvinyl chloride coated metal cylinder. However, polyvinyl chloride cylinders are inexpensive to make and are resistant to the materials with which they come into contact in this process.

The machine shown can produce approximately 200,000 gallons daily of water containing approximately ½% of a sulfurous acid from approximately $50.00 worth of sulfur at today's retail prices. The pH of this product is approximately 1.8. Control over the operation can be maintained by a single master valve 55, with or without the use of the trim valves. The trim valves are useful auxiliary controls to proportion the air supply between the upper and lower chambers.

The following are some dimensions suitable for use in this device:

Diameter of lower chamber 43: 30 inches
Height of lower chamber 43: 20 inches
Diameter of passage 42: 24 feet
Axial length of skirt 45: 4 inches
Height of upper chamber 44: 48 inches
Diameter of lower end of upper chamber 44: 30 inches
Diameter of upper end of upper chamber 44: 6 inches
Fins: Substantially the full length of the upper chamber, cast iron 16 gauge, extending outwardly about 4 inches, spaced about 1½ inches from one another at the upper end.
Outer diameter of cylindrical tube 73: 8 1/4 inches
Wall thickness of cylindrical tube 73: one-eighth inch
Inside diameter of lead tube 67: 6 inches
Wall thickness of lead tube 67: one-fourth inch
Length of lead tube 67 between flares 84 and 85: 22 inches
Axial spacing apart of ports 71: 1 inch
Length of absorption tower between grating and screen (packing height): 66 inches
Height of plenum 103: 30 inches
Diameter of enclosure 100: 24 inches As to materials of construction, the sulfur-burning tower and the absorption tower can be made of stainless steel 304. Should it be desired to use less expensive material, the absorption tower may be made of fiberglas, and the sulfur-burning tower of cast iron. However, stainless steel will have considerably longer life in both elements. Furthermore, when stainless steel is used for the sulfur-burning tower instead of cast iron, an unexpected and difficult-to-observe formation of iron sulfide is averted. A film of this sulfide, which sinks to the bottom of the molten surface after combustion ceases, floats atop the surface of the sulfur in a cast iron burning tower while burning is in process and slows down the combustion rate. Stainless steel is the preferred material for at least the lower chamber of the sulfur-burning tower, because iron sulfide is not formed from this material.

Conduit 65 may be made of stainless steel 304 or of cast iron. Both inlet nipple 77 and outlet nipple 80 may be made of stainless steel 304, while the cylindrical tube 73 may be made of cast iron. The tube 67 will, of course, be made of lead. Conduit 93 may be made of polyvinyl chloride, as may the suction breaker for the product outlet.

In operation, sulfur is initially charged into the hopper and into the bottom of the sulfur-burning tower, a flare or other ignition means is dropped through the neck, and the cap is replaced. The blower is started in operation, and the trim valves and the master valve are set to a desired rate. The primary air flow will determine a direction of swirl as shown by the arrows in FIG. 4. Nozzle 53 will discharge at least partially countercurrently thereto, usually at an upward angle of about 10°. The direction of discharge of nozzle 53 will be adjusted from time to time until the user is satisfied that its stream is rendering flow through the upper chamber as turbulent as possible to break up laminar flow which would impede through mixing of air and unburned sulfur, and which would also impede optimum heat transfer at the wall of the upper chamber.

The air flow into the lower chamber will be selected so as to burn sulfur at the desired rate, and the flow through the secondary inlet will be selected so as to provide such cooling as remains necessary despite the presence of the cooling fins, and to make flow through the upper chamber turbulent. Ordinarily, the secondary air supply will be about 150% of the primary. The proportions and amounts of the air supplied through the two inlets can be varied to suit the circumstances. The purpose of the secondary air is to assure completion of the burning of any sulfur which may be entrained with the gases exiting from the lower chamber, to cool the gases by mixing before they leave the upper chamber, and to cause the hot gases to contact the wall for heat transfer. The tapered shape of the upper chamber appears to encourage mixing of the gases and secondary air, and to encourage effective heat transfer.

Because the combustion chamber temperatures are much too hot to be handled by common materials of construction downstream from the tower, cooling in the upper chamber is of considerable importance. It is an advantage of this invention that, with the conical construction shown for the upper chamber, and with its cooling fins, a much smaller proportion of secondary air relative to primary air is required for cooling and secondary combustion purposes than has been required in previously known sulfur-burning systems. This is advantageous because the output products are less dilute, and the system can be reduced in overall size because of the basic throughput of gases is reduced. This also improves the efficiency of the absorption tower.

Gases flow through conduit 65 at about 700°F., which temperature can be withstood by cast iron or stainless steel when the gases are substantially dry. However, when the gases are first quenched by water, the resulting high temperature mixture of sulfur dioxide, sulfurous acid and water is highly corrosive, the lead tube is sufficiently resistive to it.

The hot gas flows into the lead tube and there meets an injected stream of water from the cooling jacket which enters through ports 71. Alternatively, valve 75 could have been opened, and the water in the jacket used primarily for cooling, in which case an alternate source and means for injecting water into the lead tube would be provided. It is best practice to place the ports 71 toward the lower end of the lead tube so that, should the system suddenly shut down, and these gases back up, the hot wet gases will mostly be in contact with lead, rather than immediately in contact with the conduit 65 and the sulfur-burning tower. The lead tube above ports 71 becomes a sort of isolation means for the sulfur-burning tower in the event of water backup, because the capacity of the lead tube is sufficient to accommodate all of the water which is likely to back up toward the sulfur-burning tower.

A safety shut-off for the system is shown in FIGS. 1 and 8. It is a thermally-sensitive element 160, such as a thermocouple, exposed to the temperature of the substances near the bottom of the lead tube. Should the temperature be appreciably above a safe one at this location, i.e., much above ambient, it will send a signal via circuit 161 to the blower power (i.e., motor 162 which drives the blower) to cut power to the blower, and this will promptly shut down the system.

The rate of flow of gases and water through the quenching chamber will be so adjusted that the effluent products in conduit 93 are at approximately 50°–60°F. as they enter the absorption tower. This temperature is chosen to be slightly above the ambient water temperature. The effluent gases from the quenching chamber enter the plenum and flow upwardly through the packing in which they meet the countercurrent flow of water cascading down through the packing. These cool dilute products can readily be handled by conventional materials of construction.

Incoming water to the absorption tower is directed against the splash plate which passes some of it through its perforations and bounces the rest against the distributor, and the stream of water flows as a drenching downpour rather evenly distributed over the top of the packing. The effluent from this countercurrent flow drops into the plenum, rises in the standpipe, and flows out the product outlet 107 where it may be discharged to a canal, a pond, or any other point of utility.

The rate of water flow into the system should be adjusted so that there is as near complete absorption of the sulfur dioxide as possible. A rate of about 140 gallons per minute functions well in the illustrated device when constructed with the dimensions given above, and burning sulfur at the rate of about 100 pounds per hour. About 10 gallons per minute enters the quenching chamber, and the remainder enters the absorption tower. The rate may be varied somewhat, depending on water and gas temperatures. It is advantageous to maintain the flow at such a rate that there is a gas pressure of about 6 ounces per square foot gauge in the system.

This invention provides a system wherein combustion can take place at an optimumly high temperature, the gases can readily be reduced to a lower temperature in the sulfur-burning tower while undergoing a secondary combustion, can be quenched with water in an initial absorption process in a quenching chamber made of a material which can withstand the stringent transition conditions which occur during quenching, and then can be optimally absorbed in an absorption tower. The device is elegant in that it includes the fewest possible parts to accomplish its function and is highly efficient, giving substantially 100% yields. It has been accepted for use in areas having strict sulfur emission limitations for discharge into the atmosphere and produces, at minimum cost, a very useful product.

It is possible further to instrument the device with additional controls for shutting down air supply and the like in response to excessive temperatures or lack of water supply, but these further arrangements form no part of the present invention. For suitable auxiliary controls, reference may be made to the aforesaid Ser. No. 113,289.

This invention is not to be limited by the embodiments shown in the drawings and described in the description, which are given by way of example and not of limitation, but only in accordance with the scope of the appended claims.

I claim:

1. A system for burning sulfur dioxide and for absorbing the sulfur dioxide in water, comprising:

a sulfur-burning tower comprising an enclosure formed of a bottom, a peripheral sidewall and a top, a divider disposed at an intermediate level in said enclosure dividing it into a lower chamber and tapered upper chamber reducing in cross-section as it rises in elevation, said divider extending inwardly from the side-wall and having a passage therethrough, the divider forming a peripheral shelf in the upper chamber surrounding said passage, a primary air inlet discharging into the said lower chamber, a secondary air inlet discharging into the upper chamber adjacent to said shelf so directed as to make gas flow turbulent in the upper chamber and encourage contact with the wall of the chamber, external cooling fin means attached to the wall of the upper chamber to dissipate heat therein and cool the gases in the said upper chamber to reduce the erosion of downstream components and permit higher temperatures in the lower chamber and the use of minimal quantities of air, and an outlet port passing through the enclosure at an upper elevation of the upper chamber;

a quenching chamber having an inlet and an outlet, its inlet being connected to the outlet of the sulfur-burning tower, said quenching chamber comprising a tube made of lead having an inner wall and an outer wall and a quenching passage connecting the quenching chamber inlet and outlet, a cooling jacket surrounding the lead tube and in fluid contact with its outer wall, and means to inject water into the quenching passage comprising a port through the lead tube to inject water from the cooling jacket into the quenching passage further to cool said gases in order to improve the absorption efficiency of the system;

an absorption tower comprising a vertically-rising absorption enclosure having a gas inlet at a lower elevation connected to the outlet of the quenching chamber, a gas outlet at an upper elevation open to atmosphere, and a product outlet at a lower elevation, a packing in said absorption enclosure between the gas inlet and gas outlet providing an environment for exposure of water to gases rising in the chamber, and water injection means discharging water onto the top of the packing so that water passes through the packing countercurrent to the rising gases; and water supply means supplying water to the cooling jacket and to the water injection means of the absorption tower.

2. A system according to claim 1 in which there is a substantial length of lead tube extending above the elevation of the uppermost of the ports therethrough, whereby if liquid in the lead tube backs up, there will be substantial length of lead tubing to receive it.

3. A system according to claim 1 in which a turbine type blower means supplies air under pressure to said air inlets.

4. A system according to claim 3 in which said turbine blower has the property of delivering air at a sensibly constant pressure regardless of demand within the capacity of the blower.

5. A system according to claim 1 in which water is discharged into the absorption tower against a distributor which deflects it atop the said packing.

6. A system according to claim 5 in which the enclosure of the absorption tower is radially enlarged at a location axially aligned with the distributor.

7. A system according to claim 1 in which a temperature sensor is disposed in the quenching chamber downstream of the location where water is injected therein, which sensor provides a signal to shut down the blower in the event the temperature at the sensor exceeds a predetermined value.

* * * * *